Figure 1:
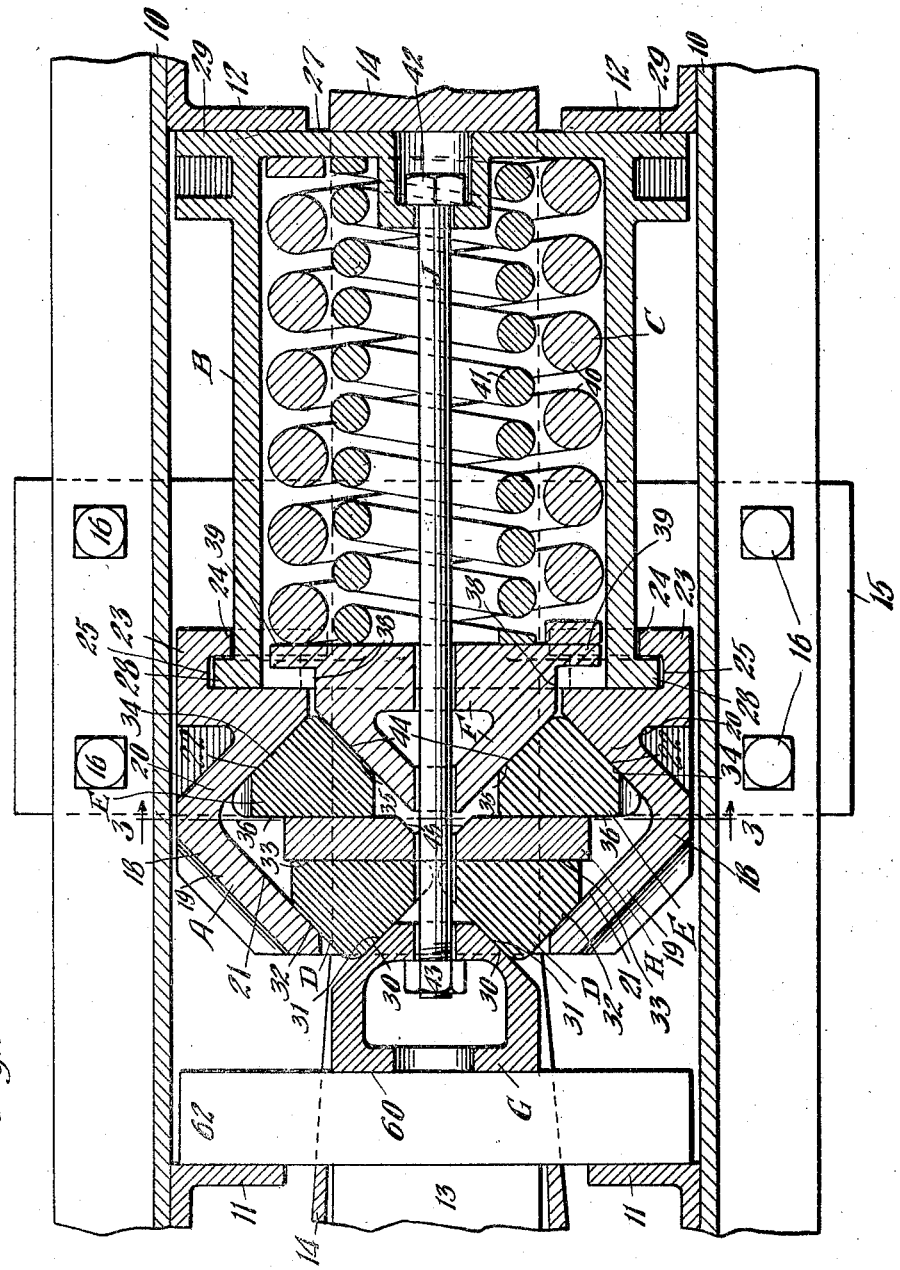

March 15, 1927. 1,620,630
A. M. BRENNE
FRICTION SHOCK ABSORBING MECHANISM
Filed Feb. 9, 1923    2 Sheets-Sheet 1

Witnesses
Wm. Geiger

Inventor
Arild M. Brenne
By Geo. F. Haight
His Atty.

March 15, 1927.
A. M. BRENNE
1,620,630
FRICTION SHOCK ABSORBING MECHANISM
Filed Feb. 9, 1923
2 Sheets-Sheet 2
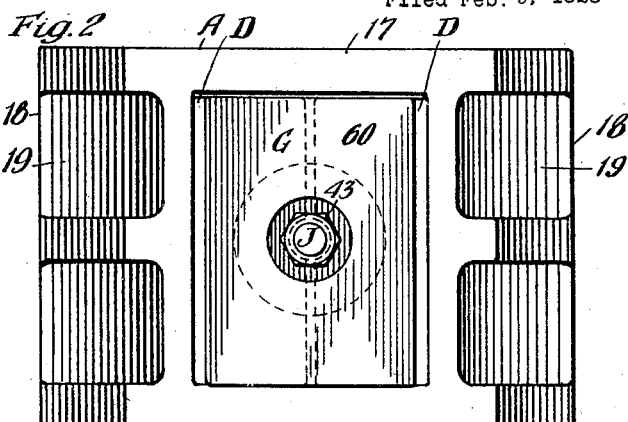
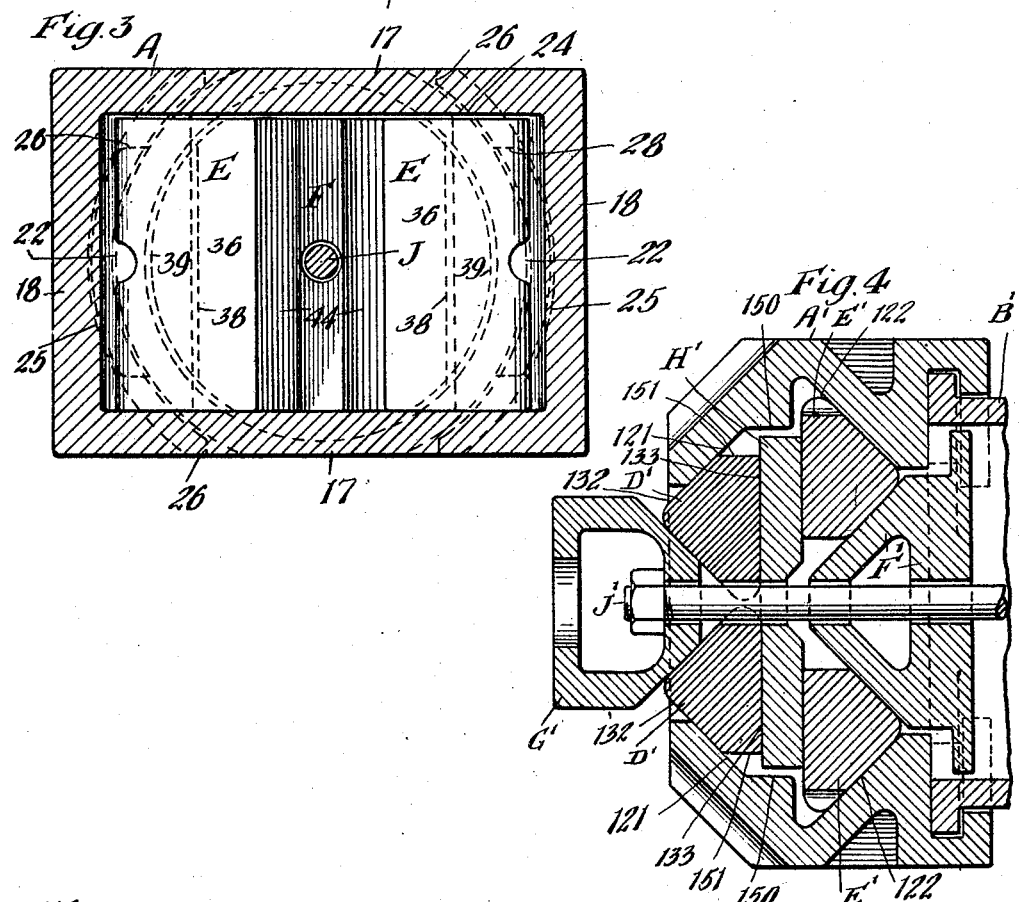
Witnesses
Wm. Geiger
Inventor
Arild M. Brenne
By Geo. T. Haight
his Atty.

Patented Mar. 15, 1927.

1,620,630

UNITED STATES PATENT OFFICE.

ARILD M. BRENNE, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed February 9, 1923. Serial No. 617,941.

This invention relates to friction shock absorbing mechanisms.

One object of the invention is to provide a high capacity friction shock absorbing mechanism, especially adapted for railway draft riggings, in which a plurality of wedge members co-act with rigid inwardly diverging and converging friction wedge faces, provided on the interior of a shell enclosing parts of the mechanism.

A more specific object of the invention is to provide a friction shock absorbing mechanism comprising: a shell which is provided with inwardly converging and diverging wedge faces on the interior thereof; a plurality of pairs of wedges each provided with flat friction faces and a pair of wedge faces, one of the wedge faces of each wedge co-acting with a wedge friction face of the shell; a friction block separating the pairs of wedges and having friction faces co-acting with the flat friction faces of the wedges; a wedge block actuated by the front follower; and a spring follower co-acting with a spring resistance, the wedge block and spring follower being provided with wedge faces co-acting with the remaining wedge faces of the wedges.

Other objects and advantages of the invention will more clearly appear from the description and claims hereinafter following.

In the drawings forming a part of this specification Fig. 1 is a horizontal longitudinal sectional view of a portion of a railway draft rigging showing my improvements in connection therewith, and illustrating the preferred form of the invention. Fig. 2 is a front end elevational view of the mechanism shown in Fig. 1. Fig. 3 is a vertical transverse sectional view corresponding substantially to the line 3—3 of Fig. 1. And Fig. 4 is a horizontal longitudinal sectional view similar to Fig. 1 illustrating a modified form of the invention but showing only the outer end of the gear.

In Fig. 1 of said drawings, 10—10 denote channel draft sills of a railway car to the inner faces of which are secured front stop lugs 11 and rear stop lugs 12. A portion of the draw-bar is indicated at 13, the same being operatively associated with the shock absorbing mechanism proper, by a hooded cast yoke 14 connected thereto. The yoke and shock absorbing mechanism are adapted to be supported in operative position by a detachable saddle plate 15 secured to the draft sills by bolts 16.

The improved shock absorbing mechanism proper, as shown in Figs. 1, 2 and 3 comprises, broadly, a friction wedge shell casting A; a spring cage casting B; a spring resistance C; an outer pair of friction wedge members D; an inner pair of friction wedge members E; a combined follower and wedge F; a wedge block G; a friction block or plate H; and a retainer bolt J.

The casting A is provided with the horizontally extending top and bottom walls 17—17 and vertically extending side walls 18—18. The vertical side walls 18 are composed of rearwardly diverging portions 19 and rearwardly converging portions 20, thereby providing inwardly diverging friction wedge faces 21 and inwardly converging friction wedge faces 22 respectively, on the interior of the shell. At the rear end of the casting A, each of the walls 18 is provided with a thickened laterally extending portion 23. The inner side of each of the thickened portions 23 is cut away on the arc of the same circle as indicated by 24 and provided with undercut circular grooves 25 concentric with the cut away portion. The top and bottom walls 17—17 are also cut away at the rear end of the casting A to provide openings 26 for a purpose hereinafter described.

The spring cage casting B is of generally cylindrical form, closed at the rear end by a wall 27 and provided at the forward end at diametrically opposite sides with laterally projecting flanges 28 adapted to engage in the undercut grooves 25 of the casting A. As clearly shown in Fig. 3, each of the flanges 28 is of such a length as to pass through one of the openings 26 formed by cutting away the top and bottom walls 17. It will be evident that when the spring cage casting is rotated through an arc of 90° from the position shown in Fig. 3, the flanges 28 will register with the openings 26 in the spring cage casting B. When the parts are in this position, the spring cage casting B and the friction wedge shell A may be easily assembled by moving the same endwise relatively toward each other until the flanges 28 are alined with the grooves 25 and rotating the spring cage on its axis through an angle of 90°, to the position shown in Fig. 3, whereupon the parts will be tightly interlocked. At the rear end the spring cage casting B is formed with laterally extending relatively thickened integral projections 29 forming abutments co-acting with the rear stop lugs 12.

The wedge block G is provided with a pair of inwardly converging wedge faces 30 and an outer flat face 60 abutting the front follower 62.

The pair of wedges D are of like construction and each is provided with a wedge face 31 co-acting with one of the wedge faces 30 of the wedge block G, a wedge face 32 co-acting with one of the wedge faces 21 of the shell and a flat friction face 33 co-acting with the outer face of the friction block H.

The pair of wedges E are also of like construction and each is provided with a wedge face 34 co-acting with one of the wedge faces 22 of the shell, a wedge face 35 co-acting with the wedge follower and a flat friction face 36 co-acting with the rear face of the friction block H. In this connection it is pointed out that the wedges E are exact duplicates of the wedges D, being arranged merely in a reversed position.

The friction block H is interposed between the wedges D and E, holding the same in proper position and preventing tilting thereof during the operation of the gear. As clearly shown in Fig. 1, the friction block H is provided centrally of the rear face thereof with a vertically extending rearwardly flaring groove 46 adapted to receive the end of the combined wedge and spring follower to compensate for wear.

The spring follower F is provided with a pair of outwardly converging wedge faces 44, each of which co-operates with the wedge face 35 of one of the wedges E, and a flat rear face forming an abutment for the spring resistance C. The opposite sides of the follower F are cut away as indicated at 38, thereby providing flanges 39 which are normally spaced from the rear face of shell A so as to allow for gradual wear on the friction elements, it being understood that the spring resistance is initially under preliminary compression.

The spring resistance C is interposed between the rear wall 27 of the spring cage and the follower F, and comprises a relatively heavy outer coil spring 40 and a relatively lighter inner spring 41.

The parts of the gear are held in assembled relation by the retainer bolt J passing through alined recesses in the wedge block G, wedges D, friction block H and the combined wedge and spring follower F, having one end anchored to the rear wall 27 of the spring cage by means of the head 42 and the other end anchored to the wedge block G by means of the nut 43.

The operation of the mechanism shown in Figs. 1 to 3 inclusive is as follows. Assuming an inward or buffing movement of the draw-bar, it is evident that the follower 62 will be forced inwardly, moving the wedge G simultaneously and uniformly therewith. During the inward movement of the wedge G, a wedging action will be set up between the same and the wedges D, and the wedges D will be moved laterally and inwardly, the friction wedge faces 32 thereof sliding on the wedge faces 21 of the shell, and the friction faces 33 sliding laterally on the front face of the friction block H. As the wedges D travel inwardly they will also effect an inward movement of the friction block H and the wedges E. During this inward movement of the wedges E, the wedge faces thereof will travel rearwardly of the converging wedge faces of the shell, thereby causing the wedges E to approach each other and effect a lateral movement of the friction faces 36 thereof on the flat rear face of the friction block H. During this rearward and lateral approaching movement of the wedges E, the wedge faces thereof by engagement with the wedge faces 44 of the combined wedge and spring follower F, will force the latter rearwardly, thereby compressing the spring resistance C.

Upon removal of the actuating forces, the springs 40 and 41 are free to expand and in so doing the parts will be moved in a manner reverse to that just described and all restored to their original position.

In the modification shown in Fig. 4, A' indicates the shell casting, which is provided with interior rearwardly diverging wedge friction faces 121 and rearwardly converging wedge friction faces 122, the wedge faces 121 being shown as provided with combined stop and friction faces 150 extending parallel to the axis of the gear and adapted to limit the lateral movement of the wedges D' by engagement with the flat end faces 151 formed thereon.

In all other respects the device shown in Fig. 4 is identical with the construction shown in Figs. 1, 2 and 3. The device as shown in Fig. 4 comprises a wedge block G', an outer pair of wedges D', a friction block H', an inner pair of wedges E', a combined wedge and spring follower F', a spring cage B' and a retainer bolt J'.

The operation of the mechanism shown in Fig. 4 is as follows. Assuming an inward or buffing movement of the draw-bar, it is evident that the wedge G' will be forced inwardly by the front follower. During the first part of the inward movement of the wedge G', a wedging action will be set up between the same and the wedges D', and the wedges D' will be moved laterally and inwardly, the wedge faces 132 thereof sliding on the wedge faces 121 of the shell, and the friction faces 133 sliding laterally on the front face of the friction block H'. As the wedges D' travel inwardly they will produce an inward movement of the friction block H', the wedges E' and the combined wedge and spring follower F' and effect the compression of the spring resistance in a manner similar to that described in connection with the preferred form of the invention shown in Figs. 1, 2 and 3. The wedges D' will move laterally and inwardly until the faces 151 thereof engage with the faces 150 of the shell, whereupon lateral movement of the wedges D' will be arrested, and the same will be compelled to slide longitudinally inwardly of the shell on said faces. It will be evident that during this movement, the wedges D' will move inwardly in unison with the wedge block D' and at the same rate, thus causing the wedges E' to move inwardly of the shell at the same rate also, thereby effecting a greater movement of the combined wedge and spring follower F' and at an increased rate, resulting in a more rapid and greater compression of the spring resistance. Upon removal of the actuating forces, the parts will be restored to their original position by the expansive forces of the springs.

From the foregoing description it will be evident that friction is created between all the wedge friction faces of the wedges, wedge block, friction shell and combined wedge and spring follower, and between each of the wedges and the friction block, thereby providing a gear of high capacity.

In both the preferred form and the modification of the invention, all of the wedge faces preferably extend at an angle of 45° to the longitudinal axis of the gear, thereby reducing the bursting pressure on the shell to a minimum, effecting an easy action in release, and by the arrangement of wedges shown, in the preferred form, obtaining a compression movement of the spring resistance equal to the travel of the gear.

Wear of the friction faces and wedge faces is compensated for by the expansion of the spring resistance, the parts of the gear being held under initial compression by the retaining bolt.

I have herein shown and described what I now consider the preferred manner of carrying out the invention but the same is merely illustrative and I contemplate all changes and modifications that come within the scope of the claims appended hereto.

I claim:

1. In a friction shock absorbing mechanism, the combination with a rigid shell having a set of inwardly converging and a set of inwardly diverging wedge faces on the interior thereof; of a follower acting means, said means and shell being relatively movable toward and away from each other; a spring resistance; and a multiple wedge system, including a plurality of wedges some of which have wedge faces co-acting with said first named set of wedge faces and others of which have wedge faces co-acting with said second named set of wedge faces, a wedge block and a combined wedge and spring follower, said wedge block being movable with said follower acting means and having wedging engagement with certain of said wedges, and said spring follower having wedging engagement with the remaining wedges.

2. In a friction shock absorbing mechanism, the combination with a main follower; of a shell having a set of opposed inwardly converging wedge faces and a set of opposed inwardly diverging wedge faces on the interior thereof, said follower and shell being relatively movable toward each other; a spring resistance; and a friction wedge system, including a plurality of wedges, a friction plate, a wedge block, and a spring follower, certain of said wedges having wedging engagement with one set of shell wedge faces and said wedge block, the remaining wedges having wedging engagement with the other set of shell wedge faces and said spring follower, said wedge block being movable with said follower, and said friction plate having frictional engagement with all of said wedges.

3. In a friction shock absorbing mechanism, the combination with a shell having a pair of inwardly converging wedge faces and a pair of inwardly diverging wedge faces on the interior thereof; of a main follower, said main follower and shell being relatively movable toward and from each other; a spring resistance; a pair of wedges co-acting with the diverging wedge faces of the shell; a second pair of wedges co-acting with the converging wedge faces of the shell; a friction block interposed between the pairs of wedges; a wedge block engaged by said follower and co-acting with one of said pairs of wedges; and a spring follower co-acting with the other pair of wedges.

4. In a friction shock absorbing mechanism, the combination with a pressure transmitting member; of a shell having two sets of opposed interior wedge faces, each set comprising an outer and an inner wedge face angularly disposed with reference to each other; of a spring resistance; a pair of wedges co-acting with the outer wedge faces of said sets; a second pair of wedges co-acting with the inner wedge faces of said sets; a wedge block engaged by said pressure transmitting member and co-acting with one of said pairs of wedges; and a spring follower co-acting with the other pair of wedges.

5. In a friction shock absorbing mechanism, the combination with a shell having a set of opposed interior inwardly converging and a set of opposed interior inwardly diverging wedge faces outwardly of said first named set; of a spring resistance; a pair of wedges co-acting with the diverging wedge faces of the shell; a second pair of wedges co-acting with the converging wedge faces of the shell; a transversely extending friction block interposed between the pairs of wedges; a spring follower co-acting with one of said pair of wedges; a wedge block co-operating with the other pair of wedges; pressure transmitting means directly engaging said wedge block, said pressure transmitting means and shell being relatively movable toward and away from each other.

6. In a friction shock absorbing mechanism, the combination with a front follower; of a friction shell having a set of inwardly converging and a set of inwardly diverging wedge faces on the interior thereof; a spring resistance; two pairs of friction wedge members, each member having a transverse flat friction face and a pair of oppositely inclined wedge faces, one wedge face of each member engaging with one of said shell wedge faces; a friction block interposed between said pairs of wedge members and co-acting with the transverse flat friction faces thereof, a wedge block engaged by the front follower and co-acting with the remaining wedge faces of one pair of said wedge members; and a spring follower provided with wedge faces co-acting with the remaining wedge faces of the other pair of wedge members.

7. In a friction shock absorbing mechanism, the combination with a front follower; of a friction shell having interior wedge faces some of which converge inwardly and others of which diverge inwardly of the shell; a spring resistance; a plurality of friction wedge members, each having a transverse flat friction face and a pair of wedge faces, one wedge face of each member co-acting with a wedge face of the shell; a friction block co-acting with the transverse flat friction face of each wedge member; a wedge block engaging the front follower; and a spring follower interposed between the wedges and the spring resistance, said wedge block and spring follower having wedge faces co-acting with the remaining faces of said wedge members.

8. In a friction shock absorbing mechanism, the combination with a shell having oppositely disposed inwardly diverging wedge faces and oppositely disposed inwardly converging wedge faces on the interior thereof, with the diverging wedge faces nearest the outer end of the shell; of a spring resistance; a multiple wedge system including a plurality of wedges having wedge faces co-acting with the wedge faces of the shell; a wedge block; and a combined wedge and spring follower, said wedge block and combined wedge and spring follower having wedge faces co-acting with the wedges.

9. In a friction shock absorbing mechanism, the combination with follower means; of a shell having opposite interior walls, provided with wedge faces, the wedge faces of each of said walls being oppositely inclined said shell and follower means being relatively movable toward each other; of a spring resistance; and a friction wedge system including a plurality of wedges, a wedge block and spring follower, each of said wedges having wedging engagement with the shell wedge faces, certain of said wedges having wedging engagement with the spring follower and the remaining wedges having wedging engagement with the wedge block, said wedge block being movable in unison with said follower means.

10. In a friction shock absorbing mechanism, the combination with a front follower; of a friction shell having on the interior thereof, a set of inwardly diverging and a set of inwardly converging friction wedge faces, and flat friction faces parallel to the axis of the gear associated with said diverging wedge friction faces; a spring resistance; a friction block; a plurality of friction wedge members each having a transverse flat friction face co-acting with said block and a pair of wedge faces, one wedge face of each member co-acting with a wedge face of the shell, and certain of said wedges having an additional friction face co-acting with a flat friction face of the shell; a wedge block engaging the front follower; and a combined spring follower and wedge member interposed between the wedges and the spring resistance, said wedge block and combined wedge and spring follower having wedge faces co-acting with the remaining wedge faces of said members.

11. In a friction shock absorbing mechanism, the combination with a shell having on the interior thereof, a set of inwardly converging and a set of inwardly diverging friction wedge faces and flat friction surfaces parallel to the axis of the gear; of a spring resistance; a multiple wedge system including a plurality of wedges having wedge faces co-acting with said first named wedge faces and friction surfaces co-acting with said friction surfaces of the shell; and a wedge block and a spring follower co-acting with said wedges.

12. In a friction shock absorbing mechanism, the combination with a shell having on the interior thereof a set of inwardly converging and a set of inwardly diverging friction wedge faces and flat combined stop and friction faces parallel to the axis of the gear; of a spring follower; a wedge block;

a spring resistance; a plurality of wedges co-acting with said wedge block and spring follower, said wedges having wedge faces co-acting with said shell wedge faces and some of said wedges having combined stop and friction faces, co-acting with the combined stop and friction faces of the shell, whereby upon engagement of said last named wedges with the combined stop and friction faces, during compressive action of the gear, lateral movement thereof is arrested and the same are moved bodily longitudinally of the gear with the wedge block.

13. In a friction shock absorbing mechanism, the combination with a friction shell having on the interior thereof, one set of wedge friction faces diverging and another set of wedge friction faces converging inwardly of the shell; of a pressure transmitting member, said member and shell being relatively movable; a spring resistance; a set of friction wedges cooperable with one set of said shell faces; a second set of friction wedges cooperable with the other set of shell faces, said two sets of friction wedges being so arranged that longitudinal movement of one set is communicated to the other set during a compression stroke; and wedge means cooperable with each set of friction wedges the wedge means co-operating with one set being movable in unison with said pressure transmitting member, and the wedge means co-operating with the other set having its movement resisted by the spring whereby, during a compression stroke, one set of friction wedges is expanded laterally and the other is simultaneously contracted laterally.

14. In a friction shock absorbing mechanism, the combination with a follower acting member; of a friction shell, said member and shell being relatively movable toward and away from each other, said shell having two sets of interior friction surfaces, the surfaces of one set being opposed to the other, each set including a face extending longitudinally of the mechanism and a pair of inclined faces; a pressure transmitting member co-operating with said follower; a second pressure transmitting member, each of said pressure transmitting members having wedge faces; a spring resistance co-operating with the second named pressure transmitting member; and a plurality of friction wedge elements, certain of said elements having friction faces co-operating with said longitudinal shell faces, and each of said friction wedge members having a pair of faces angularly disposed with reference to each other, one of the angularly disposed faces of each pair co-operating with one of said inclined shell faces, and the other angularly disposed pair co-operating with a wedge face of one of said pressure transmitting members.

In witness that I claim the foregoing I have hereunto subscribed my name this 6th day of February, 1923.

ARILD M. BRENNE.